US007846015B2

(12) United States Patent
Bansemer et al.

(10) Patent No.: US 7,846,015 B2
(45) **Date of Patent: *Dec. 7, 2010**

(54) GAMING DEVICE HAVING SKILL/PERCEIVED SKILL GAME

(75) Inventors: Mark W. Bansemer, Reno, NV (US); James G. Nolz, Reno, NV (US); Anthony J. Baerlocher, Reno, NV (US); Andrea C. Hughs-Baird, Reno, NV (US)

(73) Assignee: IGT, Reno, NV (US)

( * ) Notice: Subject to any disclaimer, the term of this patent is extended or adjusted under 35 U.S.C. 154(b) by 13 days.

This patent is subject to a terminal disclaimer.

(21) Appl. No.: 11/673,827

(22) Filed: Feb. 12, 2007

(65) Prior Publication Data

US 2007/0129133 A1 Jun. 7, 2007

Related U.S. Application Data

(63) Continuation of application No. 10/919,971, filed on Aug. 16, 2004, now Pat. No. 7,175,524, which is a continuation of application No. 09/682,407, filed on Aug. 30, 2001, now Pat. No. 6,780,103.

(60) Provisional application No. 60/229,409, filed on Aug. 31, 2000.

(51) Int. Cl.
*A63F 9/24* (2006.01)
*A63F 13/00* (2006.01)
*G06F 17/00* (2006.01)
*G06F 19/00* (2006.01)

(52) U.S. Cl. ............................................ 463/16; 463/7

(58) Field of Classification Search ...................... 463/9
See application file for complete search history.

(56) References Cited

U.S. PATENT DOCUMENTS 1,854,479 A 4/1932 Mills
4,363,485 A 12/1982 Edwall (Continued)

FOREIGN PATENT DOCUMENTS

EP 375190 A2 6/1990

(Continued)

OTHER PUBLICATIONS

"Believe It or Not ," Article written by Frank Legato, published in Strictly Slots in Jun. 2001.

(Continued)

*Primary Examiner*—John M Hotaling
*Assistant Examiner*—Kevin Y Kim
(74) *Attorney, Agent, or Firm*—K&L Gates LLP

(57) ABSTRACT

A gaming device, wherein a player's skill at an action or event determines the player's success or failure in the round. The game is readily adaptable to becoming a pseudo-skill game that would be required in most gaming jurisdictions. In one pseudo-skill embodiment, the skill game is converted to a game employing skill, but which is controlled by a set number of successful outcomes. That is, the player keeps playing until the player's skill produces the set number of successful outcomes. In another pseudo-skill embodiment, the game only appears to the player as involving skill. Instead, the gaming device randomly determines when and how many times to produce a successful outcome and increase the player's award.

24 Claims, 11 Drawing Sheets

U.S. PATENT DOCUMENTS

| | | | | |
|---|---|---|---|---|
| 4,582,324 | A | 4/1986 | Koza et al. | |
| 4,618,150 | A | 10/1986 | Kimura | |
| 4,652,998 | A | 3/1987 | Koza et al. | |
| 4,695,053 | A | 9/1987 | Vazquez, Jr. et al. | |
| 4,743,024 | A | 5/1988 | Helm et al. | |
| 4,770,415 | A * | 9/1988 | Evans et al. | 463/7 |
| 4,773,647 | A | 9/1988 | Okada et al. | |
| 4,836,546 | A * | 6/1989 | DiRe et al. | 463/18 |
| 5,116,055 | A | 5/1992 | Tracy | |
| 5,280,909 | A | 1/1994 | Tracy | |
| 5,308,065 | A | 5/1994 | Bridgeman et al. | |
| 5,340,317 | A | 8/1994 | Freeman | |
| 5,342,047 | A | 8/1994 | Heidel et al. | |
| 5,342,049 | A | 8/1994 | Wichinsky et al. | |
| 5,344,144 | A | 9/1994 | Cannon | |
| 5,361,386 | A * | 11/1994 | Watkins et al. | 345/647 |
| 5,393,061 | A | 2/1995 | Manship | |
| 5,411,271 | A | 5/1995 | Mirando | |
| 5,524,888 | A | 6/1996 | Heidel | |
| 5,542,669 | A | 8/1996 | Charron et al. | |
| 5,560,603 | A | 10/1996 | Seelig et al. | |
| 5,611,730 | A | 3/1997 | Weiss | |
| 5,645,486 | A | 7/1997 | Nagao et al. | |
| 5,766,074 | A | 6/1998 | Cannon et al. | |
| 5,769,716 | A | 6/1998 | Saffari et al. | |
| 5,772,509 | A | 6/1998 | Weiss | |
| 5,779,549 | A | 7/1998 | Walker et al. | |
| 5,788,573 | A | 8/1998 | Baerlocher et al. | |
| 5,805,444 | A * | 9/1998 | Seymour | 700/16 |
| 5,823,873 | A | 10/1998 | Moody | |
| 5,823,874 | A | 10/1998 | Adams | |
| 5,833,536 | A | 11/1998 | Davids et al. | |
| 5,848,932 | A | 12/1998 | Adams | |
| 5,871,398 | A | 2/1999 | Schneier et al. | |
| 5,873,781 | A | 2/1999 | Keane | |
| 5,882,259 | A | 3/1999 | Holmes et al. | |
| 5,882,261 | A | 3/1999 | Adams | |
| 5,910,046 | A | 6/1999 | Wada et al. | |
| 5,911,418 | A | 6/1999 | Adams | |
| 5,941,770 | A | 8/1999 | Miers et al. | |
| 5,951,397 | A | 9/1999 | Dickinson | |
| 5,967,894 | A | 10/1999 | Kinoshita et al. | |
| 5,997,401 | A | 12/1999 | Crawford | |
| 6,015,346 | A | 1/2000 | Bennett | |
| 6,019,369 | A | 2/2000 | Nakagawa et al. | |
| 6,033,307 | A | 3/2000 | Vancura | |
| 6,047,963 | A | 4/2000 | Pierce et al. | |
| 6,050,895 | A | 4/2000 | Luciano, Jr. et al. | |
| 6,056,642 | A | 5/2000 | Bennett | |
| 6,071,192 | A | 6/2000 | Weiss | |
| 6,089,976 | A | 7/2000 | Schneider et al. | |
| 6,089,977 | A | 7/2000 | Bennett | |
| 6,089,978 | A | 7/2000 | Adams | |
| 6,102,798 | A | 8/2000 | Bennett | |
| 6,110,039 | A | 8/2000 | Oh | |
| 6,110,041 | A | 8/2000 | Walker et al. | |
| 6,117,007 | A | 9/2000 | Matsuyama et al. | |
| 6,117,008 | A | 9/2000 | Machiguchi | |
| 6,120,031 | A | 9/2000 | Adams | |
| 6,126,165 | A | 10/2000 | Sakamoto | |
| 6,126,541 | A | 10/2000 | Fuchs | |
| 6,126,547 | A | 10/2000 | Ishimoto | |
| 6,135,884 | A | 10/2000 | Hedrick et al. | |
| 6,135,885 | A | 10/2000 | Lermusiaux | |
| 6,139,013 | A | 10/2000 | Pierce et al. | |
| 6,142,873 | A | 11/2000 | Weiss et al. | |
| 6,142,874 | A | 11/2000 | Kodachi et al. | |
| 6,146,273 | A | 11/2000 | Olsen | |
| 6,159,095 | A | 12/2000 | Frohm et al. | |
| 6,159,097 | A | 12/2000 | Gura | |
| 6,165,070 | A | 12/2000 | Nolte et al. | |
| 6,174,233 | B1 | 1/2001 | Sunaga et al. | |
| 6,174,234 | B1 | 1/2001 | Seibert et al. | |
| 6,174,235 | B1 | 1/2001 | Walker et al. | |
| 6,190,255 | B1 | 2/2001 | Thomas et al. | |
| 6,203,010 | B1 | 3/2001 | Jorasch et al. | |
| 6,210,279 | B1 | 4/2001 | Dickinson | |
| 6,220,593 | B1 | 4/2001 | Pierce et al. | |
| 6,220,961 | B1 | 4/2001 | Keane et al. | |
| 6,224,482 | B1 | 5/2001 | Bennett | |
| 6,224,484 | B1 | 5/2001 | Okuda et al. | |
| 6,231,442 | B1 | 5/2001 | Mayeroff | |
| 6,231,445 | B1 | 5/2001 | Acres | |
| 6,234,897 | B1 | 5/2001 | Frohm et al. | |
| 6,238,288 | B1 | 5/2001 | Walker et al. | |
| 6,251,013 | B1 | 6/2001 | Bennett | |
| 6,261,177 | B1 | 7/2001 | Bennett | |
| 6,267,669 | B1 | 7/2001 | Luciano, Jr. et al. | |
| 6,270,409 | B1 | 8/2001 | Shuster | |
| 6,270,411 | B1 | 8/2001 | Gura et al. | |
| 6,287,194 | B1 | 9/2001 | Okada et al. | |
| 6,293,866 | B1 | 9/2001 | Walker et al. | |
| 6,302,790 | B1 | 10/2001 | Brossard | |
| 6,309,298 | B1 | 10/2001 | Gerou | |
| 6,309,299 | B1 | 10/2001 | Weiss | |
| 6,315,660 | B1 | 11/2001 | Demar et al. | |
| 6,364,768 | B1 | 4/2002 | Acres et al. | |
| 6,416,409 | B1 | 7/2002 | Jordan | |
| 6,435,511 | B1 | 8/2002 | Vancura et al. | |
| 6,439,995 | B1 | 8/2002 | Hugh-Baird et al. | |
| 6,443,837 | B1 | 9/2002 | Jaffe et al. | |
| 6,488,580 | B1 | 12/2002 | Robb | |
| 6,537,150 | B1 * | 3/2003 | Luciano et al. | 463/16 |
| 6,569,015 | B1 | 5/2003 | Baerlocher et al. | |
| 6,582,306 | B1 | 6/2003 | Kaminkow | |
| 6,761,632 | B2 | 7/2004 | Bansemer et al. | |
| 6,767,284 | B1 | 7/2004 | Koza | |
| 6,780,103 | B2 | 8/2004 | Bansemer et al. | |
| 2002/0022509 | A1 * | 2/2002 | Nicastro et al. | 463/15 |
| 2002/0049084 | A1 | 4/2002 | Hugh-Baird et al. | |
| 2002/0059252 | A1 | 5/2002 | Yamaguchi | |
| 2003/0013519 | A1 | 1/2003 | Bennett | |
| 2004/0116173 | A1 | 6/2004 | Baerlocher | |

FOREIGN PATENT DOCUMENTS

| | | | |
|---|---|---|---|
| EP | 0688002 | A1 | 12/1995 |
| GB | 2 096 376 | A | 10/1982 |
| GB | 2 097 160 | A | 10/1982 |
| GB | 2 100 905 | A | 1/1983 |
| GB | 2 137 392 | A | 10/1984 |
| GB | 2 142 457 | A | 1/1985 |
| GB | 2 144 644 | A | 3/1985 |
| GB | 2 153 572 | A | 8/1985 |
| GB | 2 161 008 | A | 1/1986 |
| GB | 2 161 009 | A | 1/1986 |
| GB | 2 170 636 | A | 8/1986 |
| GB | 2 180 682 | A | 4/1987 |
| GB | 2 181 589 | A | 4/1987 |
| GB | 2 183 882 | A | 6/1987 |
| GB | 2 222 712 | A | 3/1990 |
| GB | 2 226 436 | A | 6/1990 |
| GB | 2 226 907 | A | 7/1990 |
| GB | 2 262 642 | A | 6/1993 |
| WO | WO 00/12186 | | 3/2000 |

OTHER PUBLICATIONS

Cash Chameleon Article, written by Aristocrat Technologies, published in Apr. 2001.

"The Classic Sitcoms Guide to . . . I Love Lucy—Season Two: 1952-53," [online] [printed on Dec. 9, 2003]. Retrieved from the Internet at <URL: http://classicsitcoms.com/shows/lucy2.html>.

Cyclone Advertisement, by Innovative Concepts in Entertainment, Inc., available in 1995, in or before December thereof.

Description of Gaming Machine with Animating Symbols, written by IGT, available in Jan. 2000.
Elvis Brochure, written by IGT, published in 1999, in or before December thereof.
Fey, Marshall "Slot Machines," published by Reno-Tahoe Specialty, Inc. in 1989, in or before December thereof.
"Hoyle's Rules of Games, Descriptions of Indoor Games of Skill and Chance, with Advice on Skillful Play. Based on the Foundations laid down by Edmond Hoyle, 1672-1769." Edited by Albert H. Morehead and Geoffrey Mott-Smith published 1946-1983.
"I Love Lucy—Episode Guide," [online] [printed on Dec. 9, 2003]. Retrieved from the Internet at <URL: http://www.tvtome.com/ILoveLucy/season2.html>.
"I Love Lucy Episode Guide—Job Switching ("Candy Factory")" [online] [printed on Dec. 9, 2003]. Retrieved from the Internet at <URL: http: www.youns.com/lucy/lovelucy.asp?offset=38>.
"Instant Slotto," Article written by Frank Legato, published by Strictly Slots in Apr. 2001.
"Introducing The Hottest Video Games on the Nile," written by Aristocrat Technologies, published in Oct. 2000.
Jackpot Party Brochures and Articles published by WMS Gaming Inc. in Mar. 1998.
"Mountain Coin Machine Distributing—Redemption Games—Cyclone™," [online] [printed on Feb. 28, 2002]. Retrieved from the Internet at <URL: http://www.mountaincoin.com/ice/cyclone.html>.
"Press Your Luck Original Game Show Page," written by Ottinger et al., [online] [printed on Apr. 25, 2002]. Retrieved from the Internet at <URL: http://wysiwyg://67/http://www.geocities.com/TelevisionCity/Set/7880/RULES/PYI.html>.
"Press Your Luck," Article written by Shuffle Master Gaming, published by Strictly Slots in Dec. 2000.
Primetime Amusements Redemption Games [online] [printed on Feb. 28, 2002]. Retrieved from the Internet at <URL:http://www.primetimeamusements.com/redemption.htm>.
"Reel em In®—Cast for Cash™," Brochure published by WMS Gaming, Inc. in 2001, in or before December thereof.
"Roll that Board," [online] [printed May 13, 2004]. Retrieved from the Internet at <URL: http://gscentral.net/board.htm>.
"Tickets'n'Tunes," [online] [printed on Feb. 28, 2002]. Retrieved from the Internet at <URL: http://www.rgb.com.my/amusemet-ice.html>.
Top Dollar Brochure written by IGT published in 1998, in or before December thereof.
"Weiner Distributing ICE Cyclone," [online] [printed on Feb. 28, 2002]. Retrieved from the Internet at <URL: http://www.weinerd.com/redemption-cyclone.htm>.
Winning Bid™ Brochure published by WMS Gaming, Inc. in 2001, in or before December thereof.
Office Action dated May 21, 2003 for U.S. Appl. No. 09/682,408.
Office Action dated Sep. 11, 2003 for U.S. Appl. No. 09/682,407.
Office Action dated Dec. 22, 2004 for U.S. Appl. No. 10/832,729.
Office Action dated Jun. 27, 2005 for U.S. Appl. No. 10/832,729.
Office Action dated Jul. 13, 2006 for U.S. Appl. No. 10/919,971.
Golden Tee Golf game description(earliest version of Golden Tee Golf available in 1989), printed from http://en.wikipedia.org/wiki/Golden_Tee on Dec. 10, 2008.

* cited by examiner

FIG. 8

40 68 70 72

| BASE GAME SYMBOL | NUMBER OF SUCCESSFUL OUTCOMES |
|---|---|
| 5X v. 8X | 95 |
| 8X v. 10X | 85 |
| 10X v. 15X | 75 |
| 15X v. 20X | 65 |
| 20X v. 25X | 55 |
| 25X v. 35X | 45 |
| 35X v. 50X | 35 |
| 50X v. 75X | 25 |
| 75X v. 100X | 15 |
| 100X v. 200X | 5 |

GAMING DEVICE HAVING SKILL/PERCEIVED SKILL GAME

PRIORITY CLAIM

This application is a continuation of, claims priority to and the benefit of U.S. patent application Ser. No. 10/919,971, filed on Aug. 16, 2004, which is a continuation of, claims priority to and the benefit of U.S. patent application Ser. No. 09/682,407, filed on Aug. 30, 2001, now issued as U.S. Pat. No. 6,780,103, which is a non-provisional application of U.S. Provisional Patent Application Ser. No. 60/229,409, filed on Aug. 31, 2000, the entire contents of which are incorporated herein.

CROSS REFERENCES TO RELATED APPLICATIONS

This application is related to the following commonly owned co-pending patent application: "GAMING DEVICE HAVING PERCEIVED SKILL," Ser. No. 10/832,729.

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

DESCRIPTION

The present invention relates in general to a gaming device, and more particularly to a gaming device having a bonus round wherein a player's skill at an event or action determines or appears to determine when the player wins an award.

BACKGROUND OF THE INVENTION

Gaming machines are generally games of luck, not skill. Slot machines owe certain of their popularity to the fact that a player can play a slot machine at the player's own pace with no required skills. Most slot machines are set to pay off between 80 and 99 percent of wagers of the players. Nevertheless, players constantly try to inject skill or know-how into gaming devices with the hope of turning the odds in their favor.

For example, there is a consensus as to good and bad slot machine locations. Some players believe that, the worst slot machines for the player are the machines near the gaming tables, such as blackjack, baccarat, roulette, etc. because the players of these games do not want to be distracted by the noise and commotion created by big slot machine winners. Some players believe that, for the same reason, machines near patrons betting on sporting events and horse races are not good. Some players believe that the best machines are those that are the most visible to others so that other players, or potential players, can see big payouts. Some players believe that the machines near cafes or coffee shops are rumored to be good to encourage patrons to finish quicker and return to gaming. Some players believe that machines near change booths supposedly have higher instances of big payouts to entice people in line purchasing tokens to buy more.

Another widely held belief is that slot machines go through a pay cycle, wherein the machines will payout a number of coins to meet the programmed percentage payout after a predetermined period. Players that believe a pay cycle exists may also believe that a non-payout cycle exists, wherein the machine does not payout after a big payout or a pay cycle. The object of players subscribing to the these cycle theories is to play the machines at the right time.

However, it should be appreciated that gaming machines or slot machines are programmed or set to randomly pay back a certain percentage. There are certain known methods to maximizing gaming device payouts. One such method, for instance, is betting the maximum amount which increases the payouts.

Bonus games of slot machines can also have strategy decisions for the player to make. For example, the commercially successful TOP DOLLAR® gaming machine lets the player decide to accept an award offer or reject it in the hopes of generating a higher award offer. The game displays the potential award offers to the player and provides a limited number of chances to achieve a higher award offer. The player must therefore use strategy to pick a prudent time to keep an award offer. The player wants to maximize their award but not get stuck with a low offer. The offer that the player keeps or is left with is randomly generated which makes the outcome dependent on luck.

Even though certain other gaming machines such as video poker or blackjack also involve certain strategy and decision-making, their outcomes ultimately turn upon mathematics and probability. For instance, video draw poker requires the player to keep good cards and replace bad cards. In deciding which cards are good, the player employs strategy, e.g., keep like numbered cards, cards of a same suit or if nothing else, high cards. The hand that the player is originally dealt, and the player's replacement cards, however, are a function of luck, not skill. Thus, while strategy affects the player's outcome in draw poker, luck ultimately determines the outcome.

Most gaming jurisdictions do not allow games of pure skill. Some jurisdictions, however, such as the State of North Carolina require that the game involve skill. There is no doubt that skill games are fun, exciting and interactive. A need therefore exists for a gaming device that can be easily adapted between a pure skill game and a skill game that combines skill and luck or a game having perceived skill.

SUMMARY OF THE INVENTION

The present invention overcomes the above shortcomings by providing a gaming device and preferably a bonus round of a gaming device, which is a pure skill game that can easily be converted to a game having an element of skill or an appearance of skill. The present invention includes converting the pure skill game to a pseudo-skill game in several ways. The gaming device provides a pure skill game that lets the player continue to play and accrue awards until the player's lack of skill terminates the game. In a first primary embodiment, the pure skill game converts to a pseudo-skill game by capping the amount of successful outcomes and letting the player's skill produce each of the capped number of successful outcomes. The player's skill thus determines the timing of the award of such outcome to the player. In a second primary embodiment, the pure skill game converts to a pseudo-skill game by only appearing to be skill-based, but instead randomly providing outcomes. The player's skill there does not determine the outcome.

In one implementation of the first primary embodiment, the player's skill determines when the player receives an award. In an illustration, the game presents a plurality of targets moving in a line and a gun aiming in a circular or similar pattern at the line. The player does not move the gun; rather, the game moves the gun in the circular or similar pattern, and the player estimates the time necessary for a bullet to travel to hit a bottle that will move slightly within that time period. The game provides cross hairs or a projection of the bullet onto the plane in which the bottles move, and the crosshairs follow the circular pattern of the gun. The game also randomly determines or predetermines a number of successful hits or outcomes. If the player misses the target, the game enables the player to continue until the player is successful the predetermined number of times. The player receives the same number of awards regardless of the player's actual skill. The player's skill instead determines the timing of when the game provides or activates one of the predetermined successful outcomes. The bonus round ends when the player exhausts all the successful outcomes.

In one implementation of the second primary embodiment, the player's skill only appears to determine when the player is successful. In one illustration of this embodiment, the game prompts the player to choose from a plurality of targets (e.g., turkeys) and provides crosshairs that move in a pattern around the area of the target, sometimes appearing to be aiming at the target and sometimes not. The player most likely chooses a target having crosshairs that appear to be aiming at the target in an attempt to be successful. As above, the game either randomly determines or predetermines a number of successful hits or outcomes. Here, however, the game does not activate a successful outcome based upon the player's timing or location of the crosshairs; rather, the game randomly determines when to activate a successful outcome. In this example, since the number of successful outcomes is set, the game can use the same probability each time the game determines when to activate a successful outcome.

In another implementation of the second primary embodiment, a player's skill only appears to determine when the player is successful, but the game randomly determines the number of successful outcomes. In an illustration, the game quickly and alternatively highlights one of a plurality of different valued awards and prompts for a player input. The game appears to let the player's skill in timing determine which award is selected, and the player most likely attempts to make the input when the game highlights the award having the highest value. The game in reality randomly determines the award to provide the player. The game preferably provides a number of iterations of the above described sequence, wherein the player can consecutively replace a lower valued award. The game enables the player to continue until the player is unsuccessful, i.e., chooses a lower valued award. Although the number of successful outcomes is not predetermined, the game maintains a maximum achievable award and also decreases the probability of success as the player advances.

Upon the occurrence of a successful outcome (e.g., a broken bottle, a shot turkey or upon selecting a higher valued award) the game preferably provides a monetary award to the player. In one embodiment, the game randomly selects an award from an award database. The game can select from the same award database upon each successful result or maintain different awards for each successful result. When a particular award is provided, the game can/cannot remove the selected award from the award database, so that the game cannot/can, respectively, randomly choose the same award again. The award database preferably contains gaming device credits or credit multipliers. Alternatively, the game can award any item of value to the player such as a number of picks from a bonus selection group.

In another embodiment, upon the occurrence of a successful outcome, the game provides a predetermined award. The predetermined award can be a value that the game adds to an award meter. Alternatively, the predetermined award can replace a prior award, such as when the player advances through consecutive choices, wherein the higher valued award replaces the lower-valued award.

It is therefore an object of the present invention to provide a pure-skill gaming device.

Another object of the present invention is to provide a skill gaming device that readily converts to a game having an action or event requiring skill, wherein the skill element of the round determines when the player is successful and achieves an award.

Another object of the present invention is to provide a skill gaming device that readily converts to a gaming device having an action or event requiring skill, but wherein the skill element of the round only appears to determine whether the player is successful and achieves an award.

Other objects, features and advantages of the invention will be apparent from the following detailed disclosure, taken in conjunction with the accompanying sheets of drawings, wherein like numerals refer to like parts, elements, components, steps and processes.

BRIEF DESCRIPTION OF THE DRAWINGS

FIG. 8 is a schematic diagram of a database stored in the controller of the present invention containing varying successful outcome probabilities for different competitions within the embodiment illustrated by FIG. 7.

DETAILED DESCRIPTION OF THE INVENTION

Figure 1A:
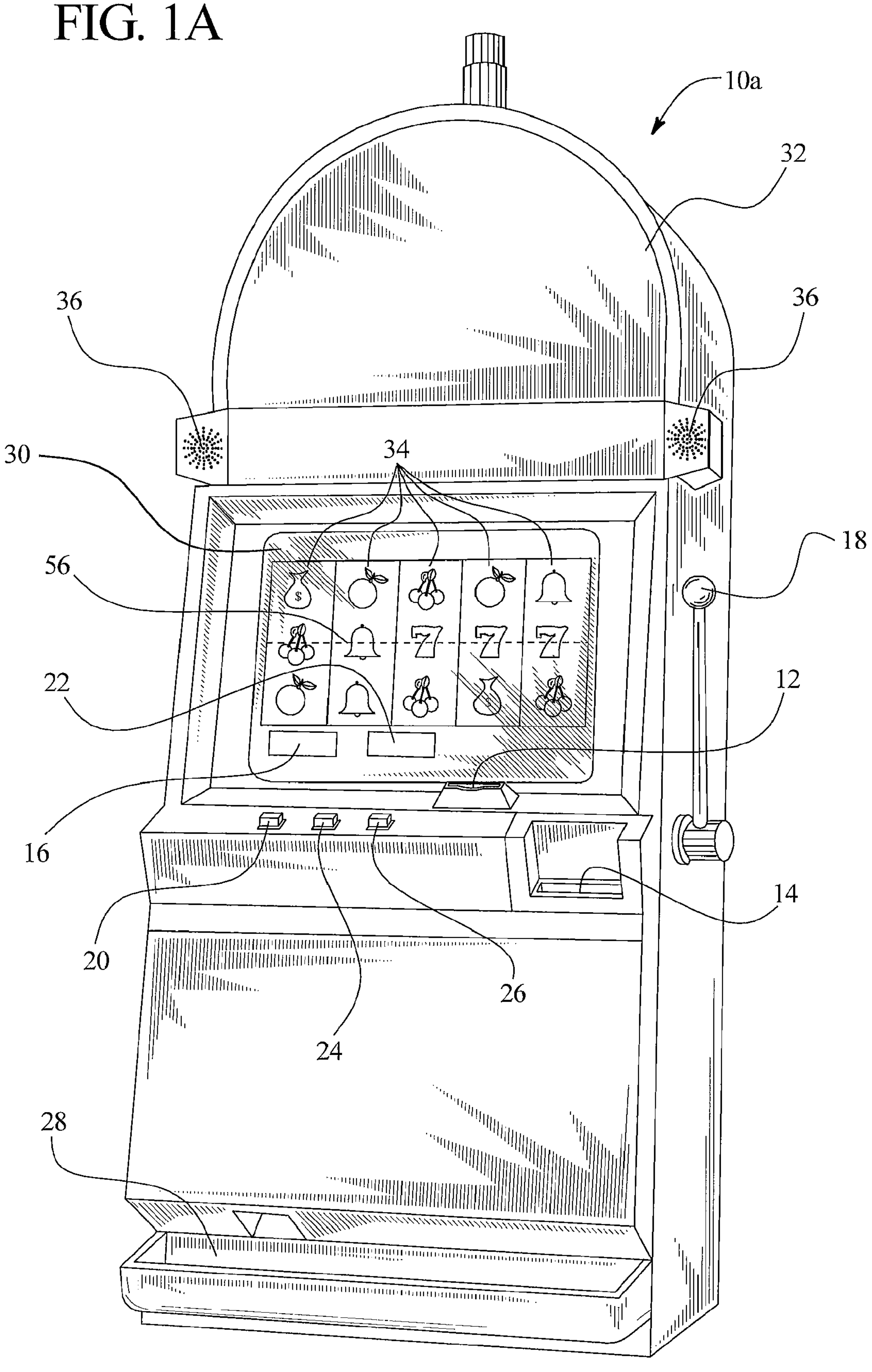
FIGS. 1A and 1B are perspective views of alternative embodiments of the gaming device of the present invention.
Figure 1B:
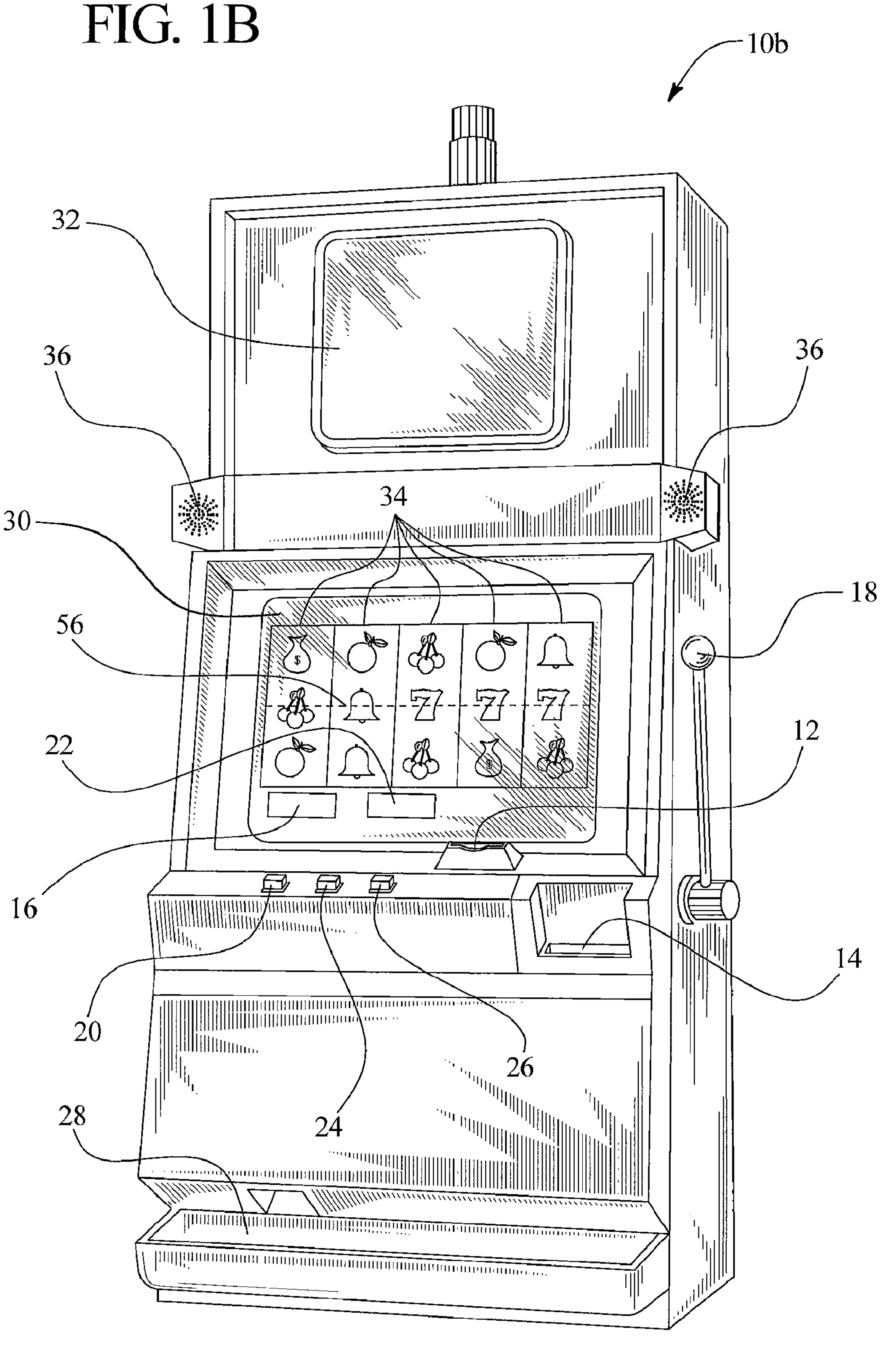

Referring now to the drawings, and in particular to FIGS. 1A and 1B, gaming device 10*a* and gaming device 10*b* illustrate two possible cabinet styles and display arrangements and are collectively referred to herein as gaming device 10. The present invention includes the game (described below) being a stand alone game or a bonus or secondary game that coordinates with a base game. When the game of the present invention is a bonus game, gaming device 10 in one base game is a slot machine having the controls, displays and features of a conventional slot machine, wherein the player operates the gaming device while standing or sitting. Gaming device 10 also includes being a pub-style or table-top game (not shown), which a player operates while sitting.

The base games of the gaming device 10 include slot, poker, blackjack or keno, among others. The gaming device 10 also embodies any bonus triggering events, bonus games as well as any progressive game coordinating with these base games. The symbols and indicia used for any of the base, bonus and progressive games include mechanical, electrical or video symbols and indicia.

In a stand alone or a bonus embodiment, the gaming device 10 includes monetary input devices. FIGS. 1A and 1B illustrate a coin slot 12 for coins or tokens and/or a payment acceptor 14 for cash money. The payment acceptor 14 also includes other devices for accepting payment, such as readers or validators for credit cards, debit cards or smart cards, tickets, notes, etc. When a player inserts money in gaming device 10, a number of credits corresponding to the amount deposited is shown in a credit display 16. After depositing the appropriate amount of money, a player can begin the game by pulling arm 18 or pushing play button 20. Play button 20 can be any play activator used by the player which starts any game or sequence of events in the gaming device.

As shown in FIGS. 1A and 1B, gaming device 10 also includes a bet display 22 and a bet one button 24. The player places a bet by pushing the bet one button 24. The player can increase the bet by one credit each time the player pushes the bet one button 24. When the player pushes the bet one button 24, the number of credits shown in the credit display 16 decreases by one, and the number of credits shown in the bet display 22 increases by one. At any time during the game, a player may "cash out" by pushing a cash out button 26 to receive coins or tokens in the coin payout tray 28 or other forms of payment, such as an amount printed on a ticket or credited to a credit card, debit card or smart card. Well known ticket printing and card reading machines (not illustrated) are commercially available.

Gaming device 10 also includes one or more display devices. The embodiment shown in FIG. 1A includes a central display device 30, and the alternative embodiment shown in FIG. 1B includes a central display device 30 as well as an upper display device 32. The display devices display any visual representation or exhibition, including but not limited to movement of physical objects such as mechanical reels and wheels, dynamic lighting and video images. The display device includes any viewing surface such as glass, a video monitor or screen, a liquid crystal display or any other static or dynamic display mechanism. In a video poker, blackjack or other card gaming machine embodiment, the display device includes displaying one or more cards. In a keno embodiment, the display device includes displaying numbers.

The slot machine base game of gaming device 10 preferably displays a plurality of reels 34, preferably three to five reels 34, in mechanical or video form on one or more of the display devices. Each reel 34 displays a plurality of indicia such as bells, hearts, fruits, numbers, letters, bars or other images which preferably correspond to a theme associated with the gaming device 10. If the reels 34 are in video form, the display device displaying the video reels 34 is preferably a video monitor. Each base game, especially in the slot machine base game of the gaming device 10, includes speakers 36 for making sounds or playing music.

Figure 2:
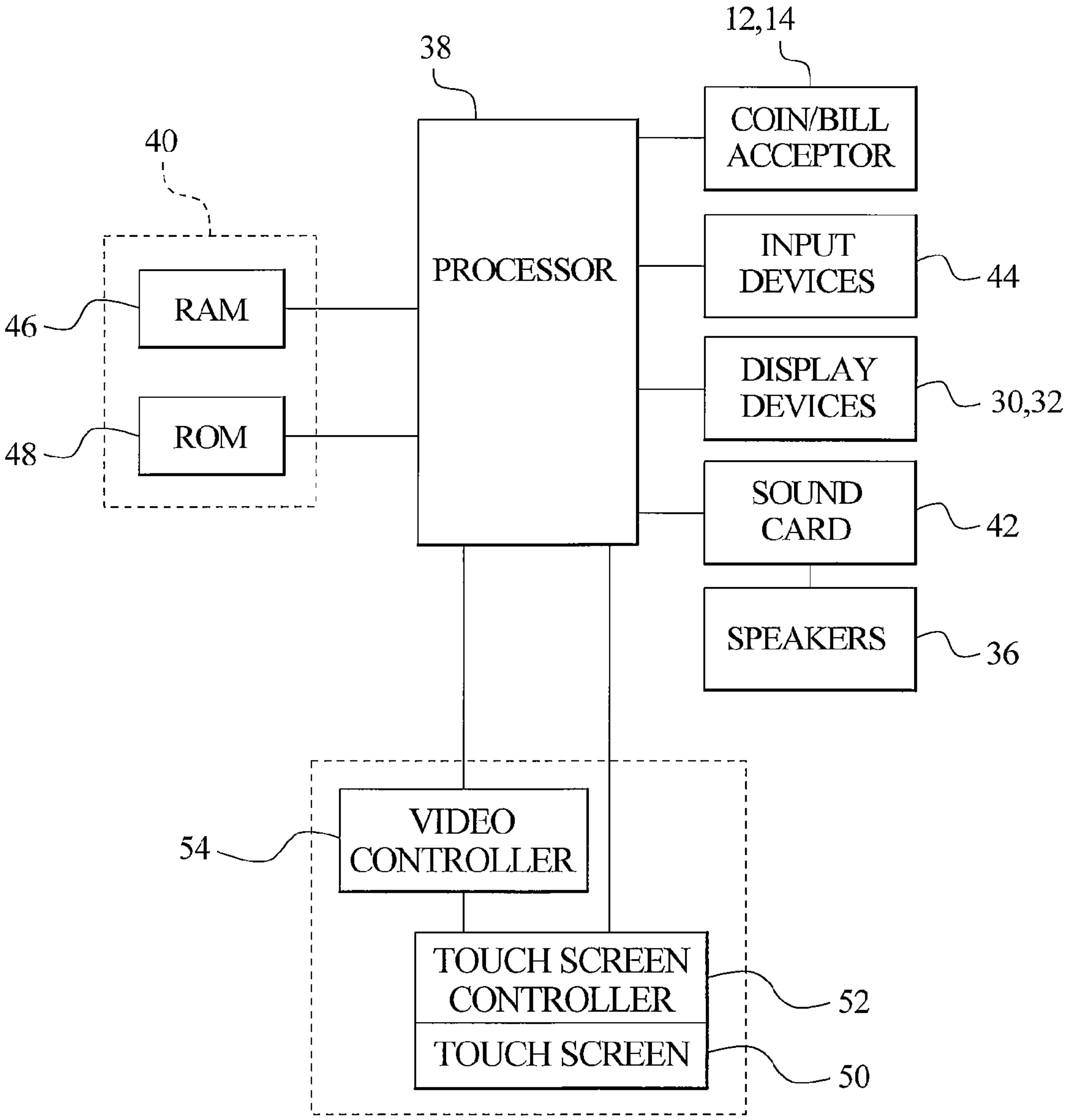
FIG. 2 is a schematic block diagram of the electronic configuration of one embodiment of the gaming device of the present invention.

Referring now to FIG. 2, a general electronic configuration of the gaming device 10 for the stand alone and bonus embodiments described above preferably includes: a processor 38; a memory device 40 for storing program code or other data; a central display device 30; an upper display device 32; a sound card 42; a plurality of speakers 36; and one or more input devices 44. The processor 38 is preferably a microprocessor or microcontroller-based platform which is capable of displaying images, symbols and other indicia such as images of people, characters, places, things and faces of cards. The memory device 40 includes random access memory (RAM) 46 for storing event data or other data generated or used during a particular game. The memory device 40 also includes read only memory (ROM) 48 for storing program code, which controls the gaming device 10 so that it plays a particular game in accordance with applicable game rules and pay tables.

As illustrated in FIG. 2, the player preferably uses the input devices 44 to input signals into gaming device 10. In the slot machine base game, the input devices 44 include the pull arm 18, play button 20, the bet one button 24 and the cash out button 26. A touch screen 50 and touch screen controller 52 are connected to a video controller 54 and processor 38. The terms "computer" or "controller" are used herein to refer collectively to the processor 38, the memory device 40, the sound card 42, the touch screen controller and the video controller 54.

In certain instances, it is preferable to use a touch screen 50 and an associated touch screen controller 52 instead of a conventional video monitor display device. The touch screen enables a player to input decisions into the gaming device 10 by sending a discrete signal based on the area of the touch screen 50 that the player touches or presses. As further illustrated in FIG. 2, the processor 38 connects to the coin slot 12 or payment acceptor 14, whereby the processor 38 requires a player to deposit a certain amount of money in to start the game.

It should be appreciated that although a processor 38 and memory device 40 are preferable implementations of the present invention, the present invention also includes being implemented via one or more application-specific integrated circuits (ASIC's), one or more hard-wired devices, or one or more mechanical devices (collectively referred to herein as a "processor"). Furthermore, although the processor 38 and memory device 40 preferably reside in each gaming device 10 unit, the present invention includes providing some or all of their functions at a central location such as a network server for communication to a playing station such as over a local area network (LAN), wide area network (WAN), Internet connection, microwave link, and the like.

With reference to the slot machine base game of FIGS. 1A and 1B, to operate the gaming device 10, the player inserts the appropriate amount of tokens or money in the coin slot 12 or the payment acceptor 14 and then pulls the arm 18 or pushes the play button 20. The reels 34 then begin to spin. Eventually, the reels 34 come to a stop. As long as the player has credits remaining, the player can spin the reels 34 again. Depending upon where the reels 34 stop, the player may or may not win additional credits.

In addition to winning base game credits, the gaming device 10, including any of the base games disclosed above, also includes bonus games that give players the opportunity to win credits. The gaming device 10 preferably employs a video-based display device 30 or 32 for the bonus games. The bonus games include a program that automatically begins when the player achieves a qualifying condition in the base game. In the slot machine embodiment, the qualifying condition includes a particular symbol or symbol combination generated on a display device. As illustrated in the five reel slot game shown in FIGS. 1A and 1B, the qualifying condition includes the number seven appearing on, e.g., three adjacent reels 34 along a payline 56. It should be appreciated that the present invention includes one or more paylines, such as payline 56, wherein the paylines can be horizontal, diagonal or any combination thereof. An alternative scatter pay qualifying condition includes the number seven appearing on, e.g., three adjacent reels 34 but not necessarily along a payline 56, appearing on any different set of reels 34 three times or appearing anywhere on the display device the necessary number of times.

Common Gaming Device Components

Figure 3:
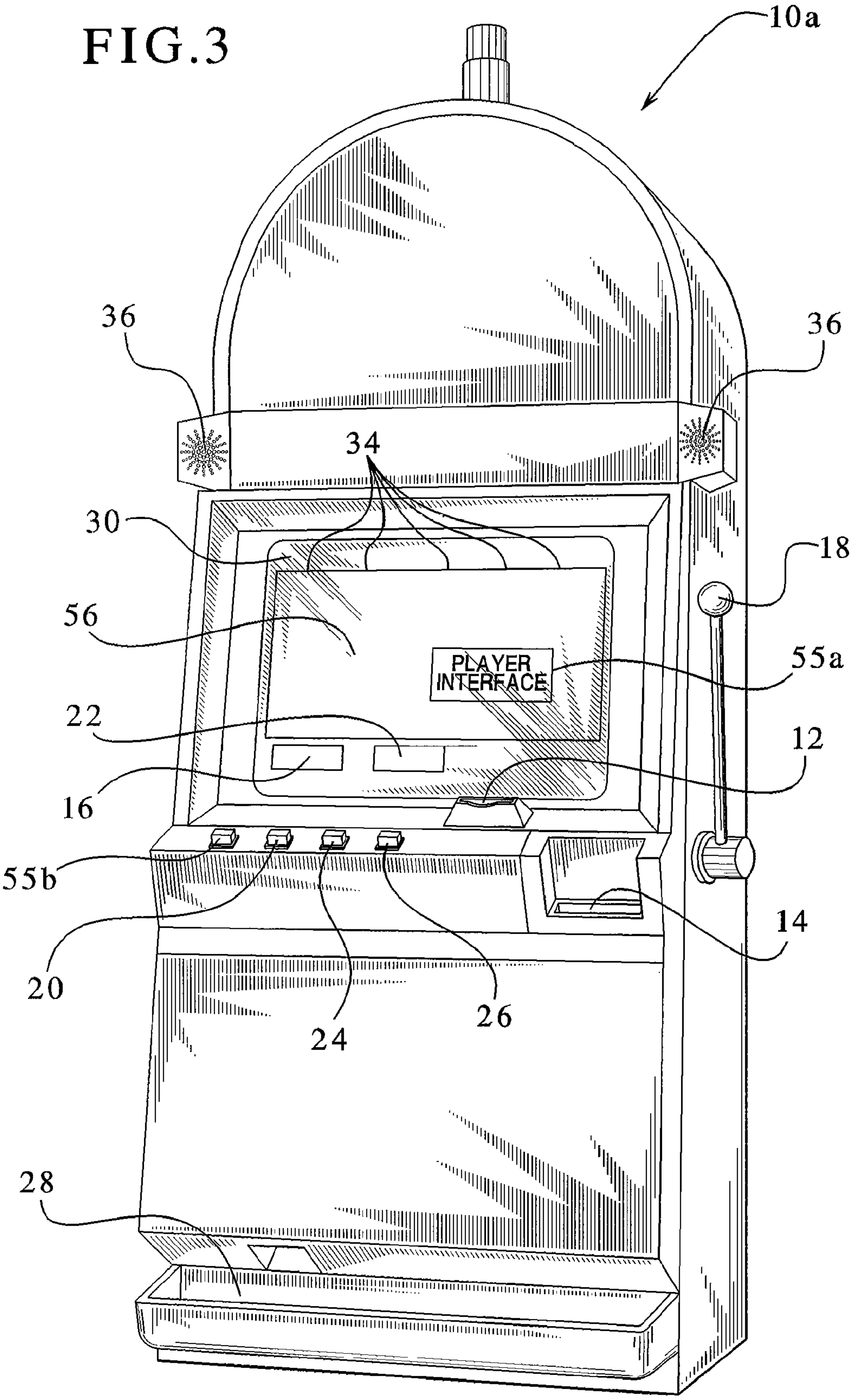
FIG. 3 is a front elevation view of the gaming device illustrating one preferred location and configuration of the player interface of the present invention.

Referring now to FIG. 3, a front elevational view of the gaming device 10*a* is shown illustrating potential locations of a player interface 55*a* or 55*b*. Each of the embodiments discussed in connection with FIG. 3 is applicable to both gaming devices 10*a* and 10*b*. Each of the embodiments described herein contains a player interface which enables the player to input a selection or decision into the gaming device. The player interface 55*a* or 55*b* can have different configurations depending upon the particular embodiment of the invention. In one embodiment, the player interface 52*a* is an input on a touch screen 50 of one of the display devices 30 or 32. The touch screen player interface 55*a* preferably employs digital inputs such as a pushbutton or a plurality of such pushbuttons. The present invention can configure the pushbuttons so that if a player maintains the pushbutton, e.g., presses an arrow for an extended time period, the controller receives a series of digital inputs. The maintainable pushbutton enables the player to steer, direct or aim an item from the touch screen 50.

If the player interface is not included on a touch screen 46, then the present invention provides an external input device 44 (FIG. 2), shown in FIG. 3 as the player interface 55*b*. The external player interface 55*b* is mounted on the gaming device 10*a* or 10*b* in a suitable location as desired by the implementor. The configuration of the external player interface 55*b* is the same as the touch screen player interface 55*a*, except the external interface employs mechanical devices, while the touch screen interface is simulated.

The external player interface 55*b* preferably employs digital input devices such as a pushbutton or a plurality of such pushbuttons. The present invention can also configure the mechanical pushbuttons so that if a player maintains the pushbutton, e.g., presses an arrow for an extended time period, the controller receives a series of digital inputs. The maintainable pushbutton enables the player to steer, direct or aim an item from the gaming device 10*a* or 10*b*. It should be appreciated that the present invention can employ other digital or analog external input devices besides pushbuttons, such as toggle switches, joysticks, digitizers or wheels etc.

Actual Skill/Predetermined Number of Successful Outcomes

Figure 4:
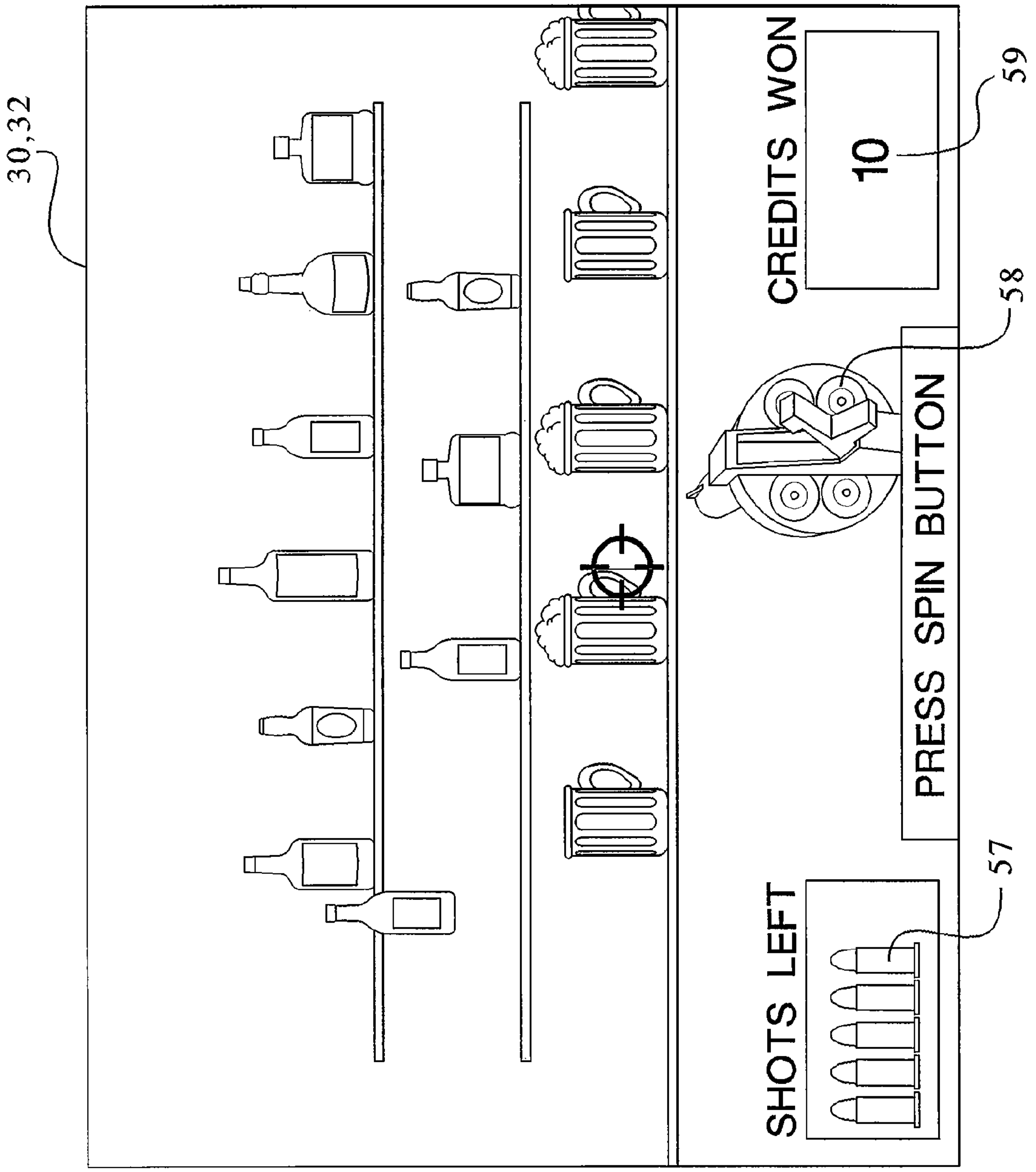
FIG. 4 is a front elevation view of the display device illustrating an example of one embodiment of the present invention, wherein the number of successful outcomes is determined and the player's skill actually determines when to activate a successful outcome.

Referring now to FIG. 4, an enlarged view of one of the display devices 30 or 32 is shown containing an illustration of one pure skill embodiment of the present invention, wherein the player's skill at timing actually determines when the player will receive an award. The embodiment is maintained as a pure skill game, wherein the player continues to play until the player's lack of skill, e.g., inability to time, ends the game of the gaming device 10. The pure skill game includes placing a cap on the number of awards or a time limit on which to achieve awards; however, one player's award relative to another's is determined purely by skill. Alternatively, in one primary embodiment, upon a bonus round triggering event, the base game of, e.g., slot, determines a number of successful outcomes that the player has in the bonus round and preferably displays that number in a successful outcome indicator 57. The display device 30 or 32 also displays an event involving skill 58 and an award meter 59.

The event involving skill 58 provides a method by which the player can exercise skill in conjunction with a gaming device display. Skill, as used with the present invention, includes a display of one's physical ability. Physical ability includes the ability to time an action within an event, as illustrated below. Physical ability also includes the ability to aim a device within an event. The present invention contemplates requiring the player to aim a gun, steer a car, aim a basketball shot or baseball throw, etc. or maneuver any device having directional flexibility. The player's ability to time or aim within the event involves the player's ability to see and to react, e.g., push a button, steer a wheel, etc. at the right time. The present invention contemplates employing physical, yet non-motor skills such as a player's ability to hear and select a sound emanating from a particular location or speaker.

Skill can also include a display of one's mental ability. The present invention contemplates requiring the player, for example, to count a plurality of items displayed within the event involving skill 58 and to input a selection based on the resulting number. The present invention contemplates requiring the player to perform a mathematical function such as adding, subtracting, multiplying or dividing a plurality of awards or a combination thereof and to make a selection based upon the resulting number.

As a test of one's mental ability, the present invention contemplates momentarily displaying a plurality of items or values and then requiring the player to remember where a particular item is located or the value of a particular item and to make a selection accordingly. The present invention contemplates displaying a plurality of symbols or items and requiring the player to visually match two or more items.

Mental skill also includes forming a strategy or predicting future events based on one's knowledge. For example, one implementation includes a video structure built from a plurality of structural elements. The gaming device 10 prompts the player to sequentially remove elements and win points until the overall structure collapses. The player's knowledge of structural support and balance affects the number of wins and the overall award.

It should then be appreciated that the present invention includes a multiple layer skill or pseudo-skill events, wherein each player's decision determines if an immediate outcome is provided to the player and at least partially determines if a subsequent outcome is provided to the player. Additionally, multiple player decisions could determine one or more successful outcomes. This could be implemented with any known game of skill such as tic-tac-toe, chess, and checkers. In such game, the player makes multiple decisions and the decisions determines the timing of the successful outcome(s) provided to the player as described above, or appear to the player to determine the outcome, but in fact the outcomes are determined based on probabilities unrelated to the player's decisions. It should further be appreciated that the multiple decisions could have different levels of difficulty, wherein it is harder for the player to achieve a successful outcome on one level then on another level. In this embodiment, while the player obtains the same ultimate award, it takes longer, on average, on one level for the player to achieve the successful outcomes than on another level. This increases the enjoyment and excitement of the game.

An action involving skill therefore requires physical or mental work by the player. It requires a decision by the player other than a guess or mere random selection. Choosing one of a plurality of masked values does not require skill. Choosing the one masked value having indicia that the game displayed a moment earlier requires memory, alertness and keen eyesight and therefore requires skill as it is used in this invention.

In the illustration of FIG. 4, the event involving skill 58 includes a gun and associated crosshairs as shown in FIG. 4. The cross hairs represent the location of the bullet, if fired, in the plane of the targets or objects. The targets or objects are beer mugs and liquor bottles (i.e., two different levels as described above). The present invention preferably provides and displays a theme associated with the bonus round. In this embodiment, the theme includes a wild west saloon, wherein the player shoots at moving bottles to obtain points. The event involving skill 58 includes a gunshot, and the game awards points when the player hits a glass or bottle.

The player interface 52*a* or 52*b* directs the processor 38 to shoot, i.e., controls the timing of the shot. In this illustration, the player doesn't aim the gun; rather, the mugs and bottles traverse across the screen and the gun tip and crosshairs move in a slight circular pattern. The player has no control over the gun's aim at any given time. The skill involves timing, wherein the player shoots when the circular moving crosshairs are directly on or slightly ahead of the target.

The game is programmed to determine if the player has properly timed the input to shoot. In one embodiment, the software of the present invention determines if the crosshairs are within ⅛ inch tolerance around the mug or bottle at the time of input. The tolerance can be any distance desired by the implementor, which those skilled in the art of software and game design can program into the gaming device. The present invention preferably makes hitting a mug or bottle relatively easy so that a player can play the bonus round in a relatively short period of time. The game can also include a maximum number of shots, which gives the player many attempts, but ends or shortens the round in a situation where a player intentionally and successfully tries to miss. As indicated above, the game could alternatively make each level, tolerance or criterion different such that the beer mugs and the bottles have different level of difficulty. While the player will ultimately achieve the same result, it will be more difficult for the player to achieve the successful outcomes on one level than on subsequent levels.

The game provides suitable audio and visual displays to prompt the player to initiate an action involving skill, i.e., the game provides the "Press Spin Button" message. In this illustration, the game employs the play or spin reels button 20 to serve as the player interface in the bonus round. The game can alternatively employ a separate player interface 52*a* or 52*b*. It should be appreciated that the game can employ a suitable audio message in accordance with the theme, such as, "Go ahead, take your best shot, partner."

The successful outcome indicator 57 contains bullets, wherein each bullet represents a remaining number of successful outcomes, e.g., mug or bottle hits. The award meter 59 displays the credits accumulated for hitting a mug or bottle. In display device 30 or 32 of FIG. 4, the player has currently hit 10 credits worth of mugs or bottles.

Figure 5:
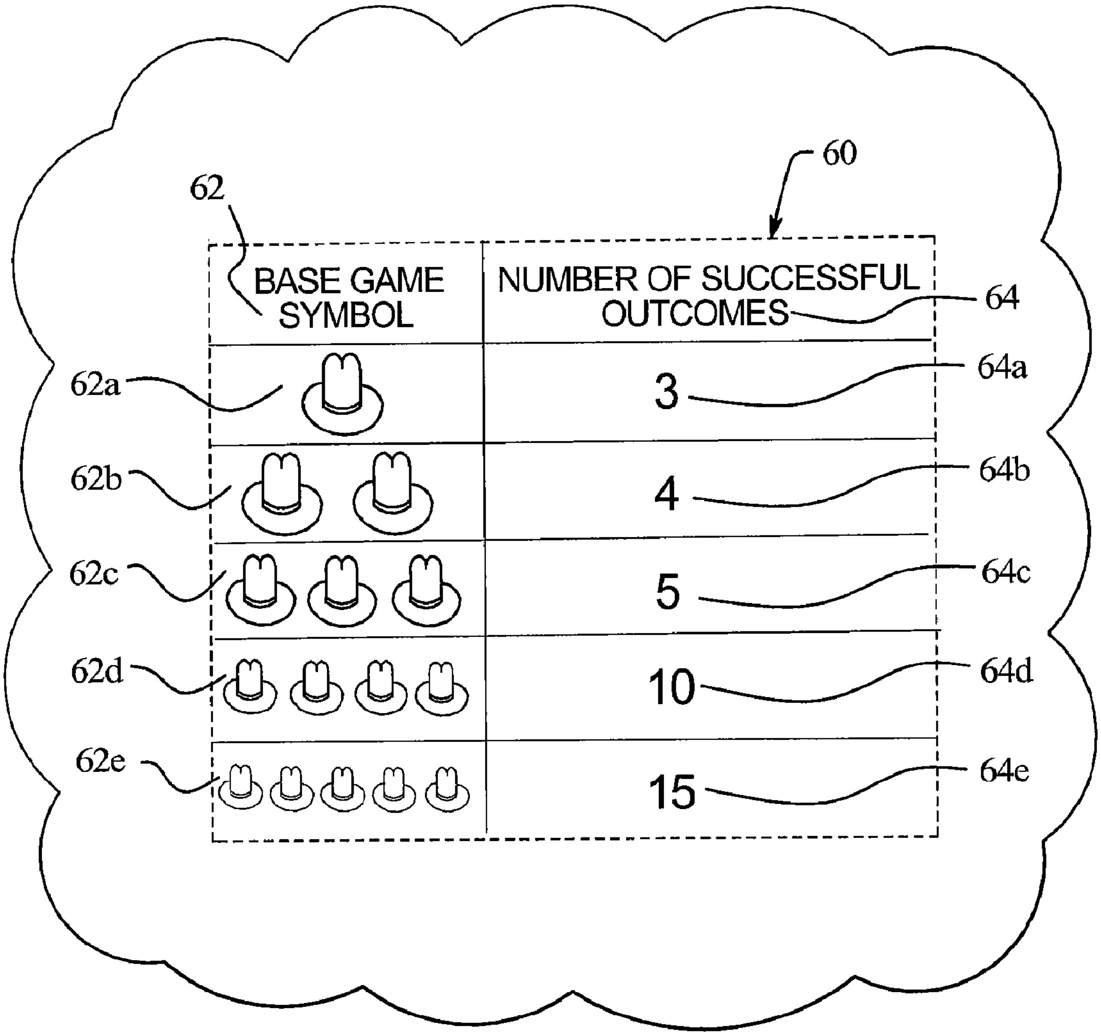
FIG. 5 is a schematic diagram of a database stored in the controller of the present invention having different successful outcomes for different combinations of base game symbols.

Referring now to FIG. 5, an area of the memory device 40 of the present invention is shown containing a success table or database 60. The success database 60 defines the number of successful outcomes that the player has in the bonus round. The success database 60 has a symbol column 62 containing a plurality of symbols any one of which invoke the bonus round, namely, the symbols 62*a* through 62*e*. These symbols in an embodiment are generated by the base game reels 34. The symbols 62*a* through 62*e* can be any single symbol or combination of symbols. The symbols preferably correspond to a game theme and are shown here as one or more cowboy hats.

The success database 60 includes a success number column 64 having a number 64*a* through 64*e* corresponding to each of the symbols 62*a* through 62*e*. The game preferably provides a higher success number in the column 64 for a less probable symbol combination in the column 62. It should be appreciated that obtaining a plurality of required symbols is less likely than obtaining one required symbol. As shown in the success database 60, the more symbols 62 or hats required, the more successful outcomes 64 the game gives to the player. It should also be appreciated that generating base game symbols is a random event. The success database 60 predetermines the success number in the column 64 based on the combination in the column 62. In this embodiment, therefore, the number of successful outcomes is a product of a random event and a predetermination.

The game can alternatively assign the success number 64*a* through 64*e* completely randomly, e.g., by providing a successful outcome for each generated symbol. In an alternative embodiment, the game could award the same, number of successful outcomes 64 each time the player enters a bonus round. That is, gaming device 10 can predetermine the success number. Further alternatively, the game could base the number of successful outcomes 64 upon some basis other than base game symbols, such as the number of paylines played or whether the player has wagered a maximum allowable amount.

In the first primary pseudo-skill embodiment, the number of successful outcomes 64 defines the extent of the player's award. That is, the player will receive only the number of awards equal to the number of successful outcomes 64. The skill evaluation determines when the game will activate one of the successful outcomes 64. In the illustration above, if the player's shot hits a mug or liquor bottle, the game activates one of the successful outcomes, determines an award, which is displayed in the award meter 59 and subtracts one of the bullets from the successful outcome indicator 57. The player continues until activating and exhausting all successful outcomes.

Perceived Skill/Predetermined Number of Successful Outcomes

Figure 6:
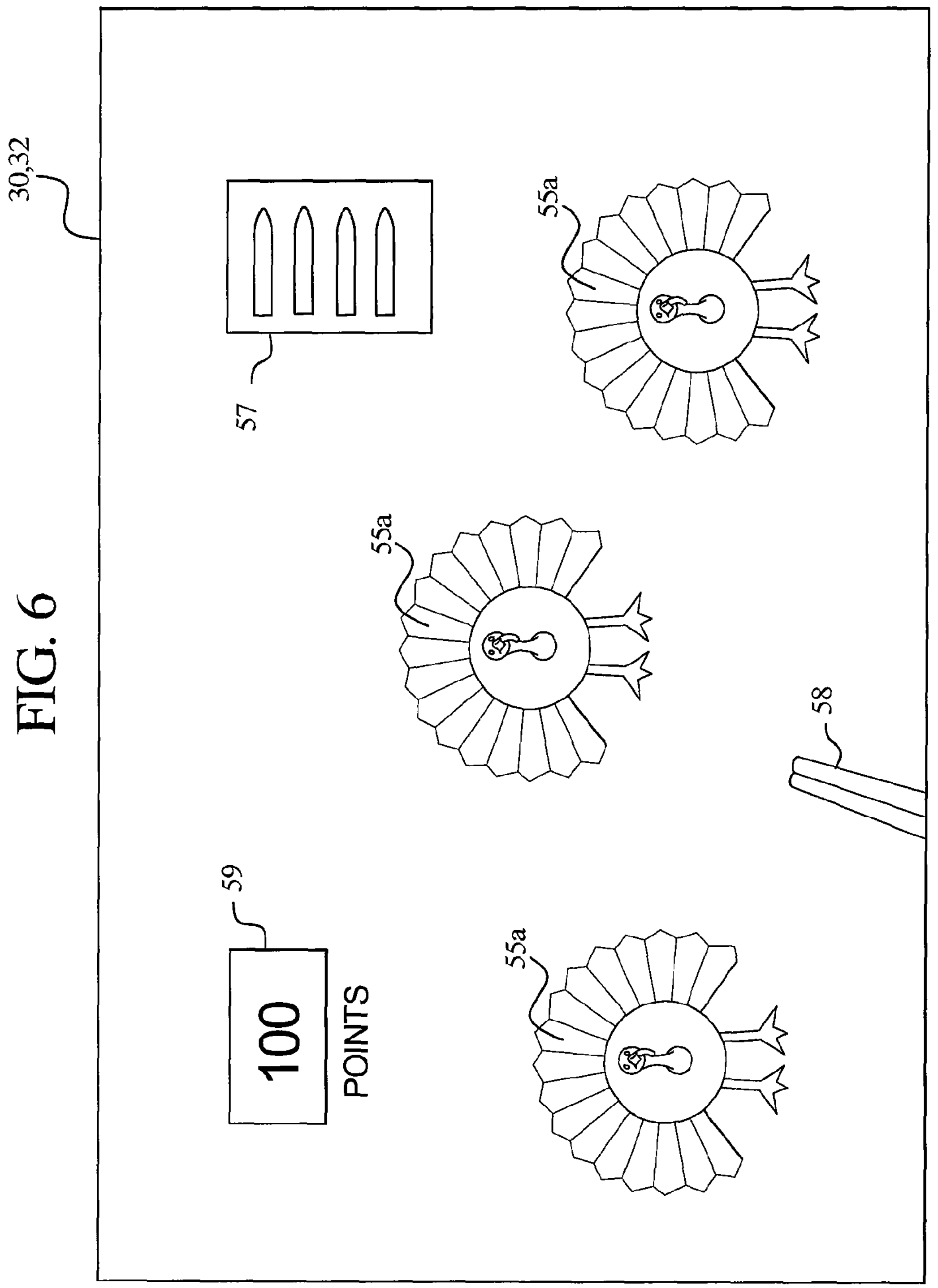
FIG. 6 is a front elevation view of the display device illustrating an example of another embodiment of the present invention, wherein the number of successful outcomes is determined and the player's skill appears to determine when to activate a successful outcome.

Referring now to FIG. 6, another pure skill embodiment is shown, wherein the player is required to aim a gun at crosshairs. In this pure skill embodiment, the player continues to play until the player's lack of skill, e.g., lack of ability to aim, ends the game. Again, the pure skill gaming device may be adapted to place hard limits on the player's award, but until the limit is reached, the player's award is controlled completely by skill. In the second primary embodiment, the pseudo-skill game randomly determines when to invoke or activate a successful outcome 64 from the database. That is, the processor 38 is not programmed to determine if the player's timing or aim is accurate; rather, the game maintains a certain probability of success in memory 40, e.g., 60%, and randomly determines the player's success or failure. It should be appreciated that the game can maintain any desired probability of success, however, the game preferably sets the probability to a point that enables the bonus round to proceed expeditiously. The present embodiment gives the illusion that the player's skill at an action determines whether the player wins an award.

The display device 30 or 32 of FIG. 6 is an illustration of this embodiment and preferably includes a touch screen 50 (FIG. 2) and a plurality of targets, e.g., turkeys, which are each a selectable player interface 54*a*. The display device 30 or 32 of FIG. 6 also preferably contains a successful outcome indicator 57, wherein a number of bullets indicate the number of "hits" or successful outcomes that the controller maintains. The screen preferably maintains an award meter 59 that updates the player's accumulated award for the round as the player converts successful attempts into credits or multipliers.

In this illustration, a shotgun, the turkeys and a gunshot comprise the event involving skill 58. When the bonus round begins, the game displays a number of turkeys each having associated crosshairs moving in circular, "figure 8" or some other desirable pattern about the body, head and area surrounding the turkey. The crosshairs (and an associated shot) are thus at times not superimposed upon (i.e., not going to hit) the turkey. The game appears to make a player judge or determine the right time to shoot a turkey. When the player judges that a cross-hair is on one of the turkeys, the player touches the turkey, which is a player interface 55*a* of the touch screen 50.

The present illustration preferably provides a suitable message such as, "touch a turkey and split his tail feathers" or "don't take that from a turkey, touch him and shoot the gun." The turkeys preferably appear and disappear in different places on the display device 30 or 32 of FIG. 6. When the player touches a turkey, the game preferably displays the shotgun take aim and fire at the turkey. The player hears the sound of the gunshot and smoke or fire from the gun. The game also represents the turkey being hit (e.g. the game shows a cooked turkey or a turkey flying away to heaven) or displays a suitable message informing the player of a miss.

When the player presses a turkey, the game randomly determines whether the gunshot hits the turkey. That is, the player can press a turkey 55*a* when the crosshairs of the gun are clearly not superimposed upon the turkey and still hit the turkey. The skill at aiming or timing has no effect, which is different than the first primary embodiment wherein the aiming or timing determined when to activate an award. The game, here, randomly determines whether the player hits the turkey based upon a predetermined percentage. If the game randomly determines that the player hits the turkey, the game activates one of the successful outcomes, determines an award, which is displayed in the award meter 58 and subtracts one of the bullets from the successful outcome indicator 54. The player continues firing until the game randomly activates and exhausts all the successful outcomes.

Perceived Skill/Random Number of Successful Outcomes

Figure 7:
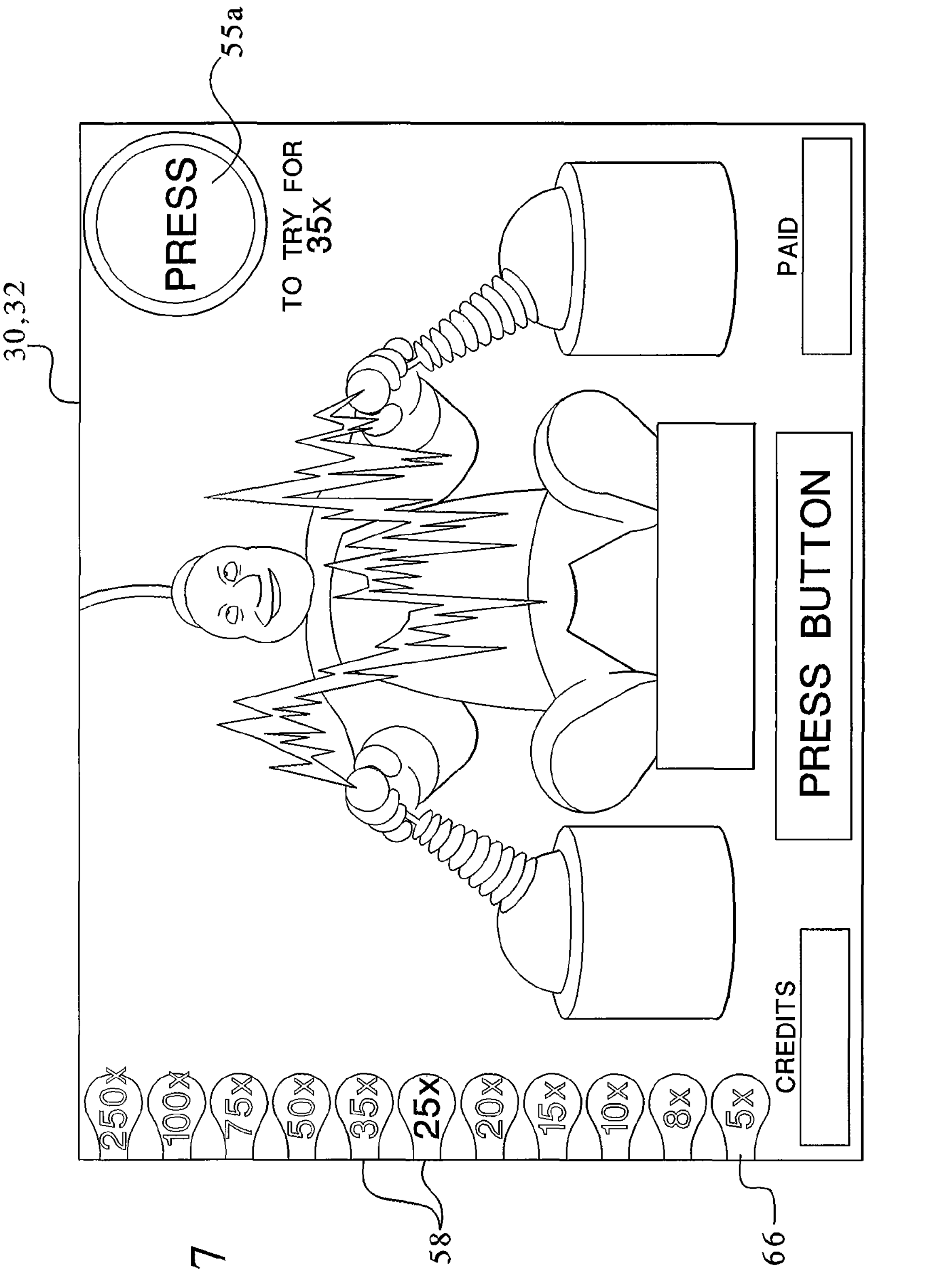
FIG. 7 is a front elevation view of the display device illustrating an example of a further embodiment of the present invention, wherein the number of successful outcomes is randomly determined and the player's skill appears to determine when to activate a successful outcome.

Referring now to FIG. 7, a further pure skill embodiment of the present invention again involves timing. The player plays and wins until the player does not time correctly. Here, the award is capped at 250X, and the player upgrades the award when the player skillfully selects between the choices. The timing in an embodiment becomes more difficult as the player skillfully advances. The top award may require substantial skill, so that the game usually ends prior to the top award due to a lack of skill.

In another example of the second primary embodiment, which involves perceived skill, the number of successful outcomes is randomly determined. That is, the game randomly determines when the player is successful and how many times the player is successful. The player, however, believes or is led to believe that the player's skill at timing or aiming, etc. determines when and for how long the player is successful.

The display device 30 or 32 of FIG. 7 is an illustration of this embodiment and preferably includes a touch screen 50 (FIG. 2) and a selectable player interface 55*a*. The event involving skill 58 includes the game quickly and alternatively highlighting one of a plurality of different valued awards 66, i.e., the awards 5X through 250X, while prompting the player to select the player interface 55*a*. The game provides a suitable visual prompt, wherein the game displays, "Press to try for 35X". The game also provides audio prompting in accordance with the theme of the illustration, such as, "Crank it" or "Hit me with the juice".

The event involving skill 58 in FIG. 7 alternates between highlighting a higher and lower valued award 66, e.g. the 35X and the 25X. FIG. 7 illustrates the game currently highlighting the 25X. The alternating highlighting is designed to appear to the player as a test of the player's skill in timing the selection of the player interface 55*a*, so that the selection occurs when the game highlights the higher value, e.g., the 35X. The game preferably alternates between symbols quickly enough so that the player cannot distinguish whether the timing is successful. The game in reality randomly determines which award to provide the player according to a database of probabilities.

Referring now to FIG. 8, a database 68 having a competition column 70 and a probability column 72 stored in an area of the memory device 40. The database 68 contains each of the competitions in the column 70 between two of the awards 66 illustrated in FIG. 7. For example, the database 68 contains the 25X v. 35X competition in the column 70. The database 68 contains a likelihood or probability of advancement in the column 72 for each of the competitions in the column 70. The probabilities in the column 72 preferably decrease as the values of the competitions increase in the column 70 in some linear or non-linear manner desired by the implementor. For example, the database 68 illustrates that the player has a 95% chance of correctly choosing the 8X over the 5X. The database 68 illustrates that the player only has a 5% chance of correctly choosing the 250X over the 100X and a 45% chance of choosing the 35X over the 25X.

As illustrated by FIG. 7, the game preferably provides a number of player attempts at the above described event involving skill 58, wherein the player can consecutively replace a lower valued award. The game preferably enables the player to continue until the player is unsuccessful, i.e., "chooses" a lower valued award. When the player finally fails at the event involving skill 58, the game preferably awards the highest value award 66 achieved, as illustrated by the display device 30 or 32 of FIG. 9.

Figure 9:
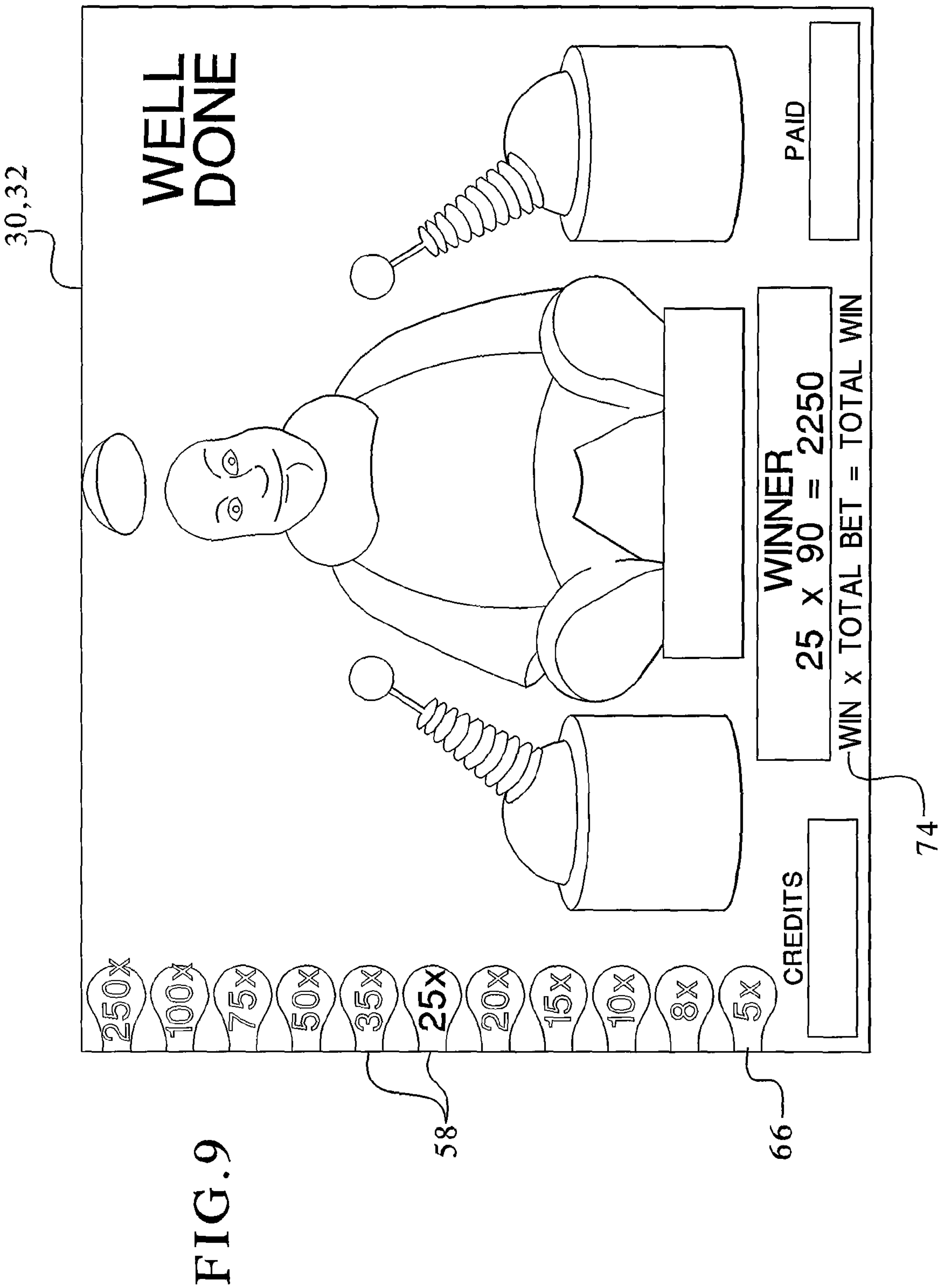
FIG. 9 is a front elevation view of the display device further illustrating the embodiment of FIG. 7, wherein the gaming device provides an indication of a player's award.

The display device 30 or 32 of FIG. 9 displays a winning total 74 that includes the 25X award obtained through the event involving skill 58, which is a multiplier. The game multiplies the award 66 by a base game number, here the player's total bet, to arrive at a total win of credits. It should be appreciated that the game can award any form of prize such as a number of credits, a multiplier number that multiplies a number of gaming device credits or any other prize desired by the implementor, such as a number of picks from a group of credit producing selections. The awards can have any value desired by the implementor and can ultimately be exchanged for money.

In the illustration of FIGS. 7 though 9, the number of successful outcomes is not known and the player can theoretically have no successful outcomes (get the minimum 5X) or have up to 10 successful outcomes. Even though the number is not predetermined, the absolute maximum number of successful outcomes is predetermined and capped. When the number of successful outcomes is randomly determined (as is done here), the game preferably randomly activates a successful outcome (as is done here).

Award Databases

Figure 10:
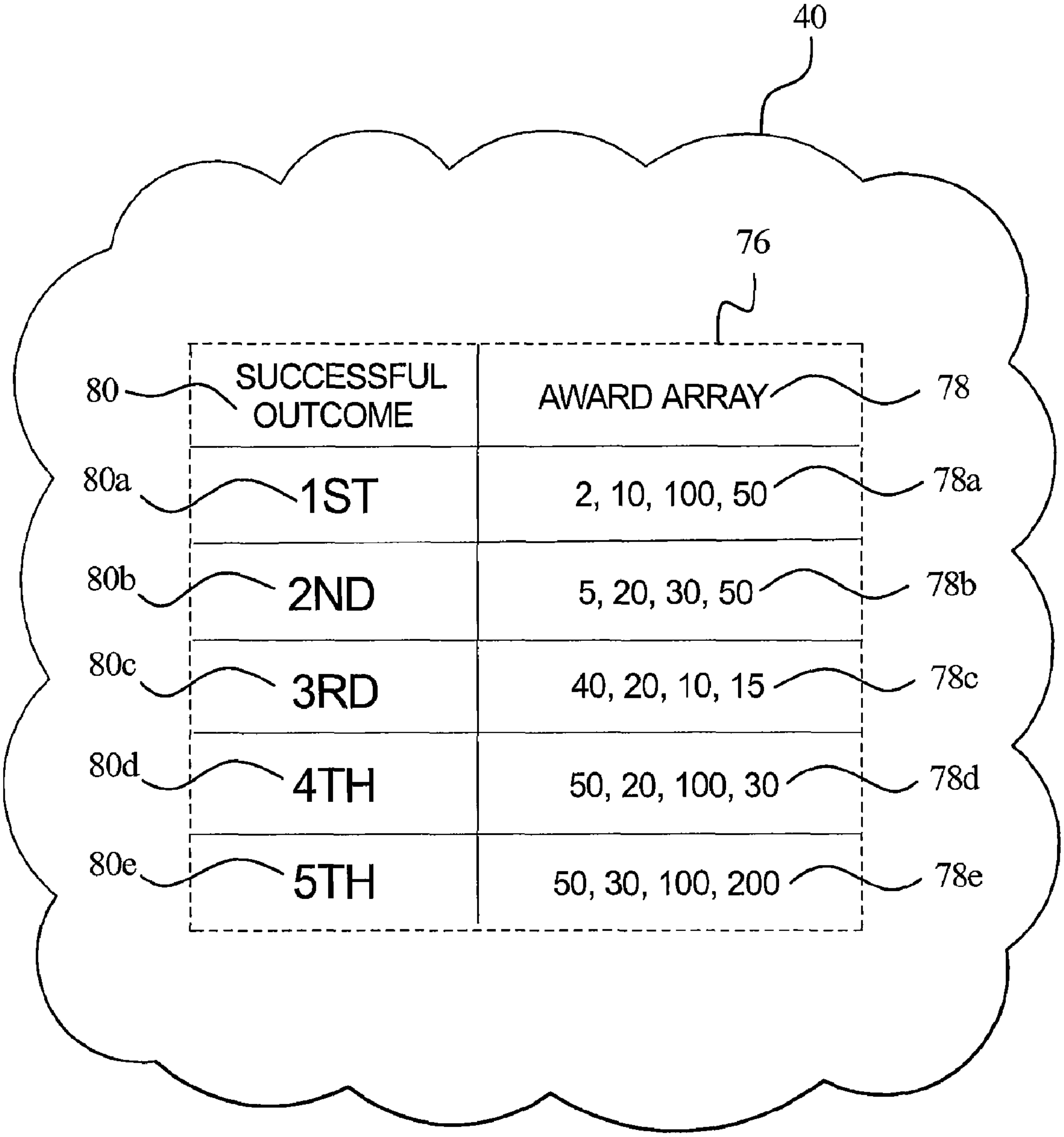
FIG. 10 is a schematic diagram of a database stored in the controller of the present invention having different award arrays for different successful outcomes.

Referring now to FIG. 10, an area of the memory device 40 of the present invention is shown containing an award table or database 76. When the event involving skill 58, in either the true skills or pseudo-skill embodiments, displays the awards, such as the awards 66 of the embodiment illustrated by FIGS. 7 and 9, the game does not require or use an award database 76. That is, the game pre-determines the monetary gaming awards for successful outcomes. However, when the event involving skill 58 does not indicate or include an actual award, such as in the embodiments illustrated by FIGS. 4 and 6, the game does employ a separate award database, such as the database 76.

The award database 76, as illustrated, contains an award array column 78 for each sequential successful outcome in the column 80 of the bonus round. The award database 76 shows a different award array 78*a* through 78*e* for each successive successful outcome 80*a* through 80*e*. Alternatively, the game can employ one award array for every successful outcome or repeat at least one award array.

When the game provides only one award array for each successful outcome, such as outcomes 80*a* through 80*e*, the game preferably does not exclude, remove or replace an award after the game has randomly selected it. That is, the game can select the same award more than once.

When the game provides a different award array, e.g. 78*a* through 78*e*, for each successful outcome, 80*a* through 80*e*, the implementor can award higher average values for later successful outcomes as desired. For example, the implementor can place the highest average awards in the award array 78*e*, the second highest in award array 78*d*, etc. It should be appreciated that the implementor can place the same average valued awards in each array or maintain any desired award distribution.

In a preferred embodiment, successful outcomes provide a monetary award or invoke the award database 76 in the pure or pseudo-skill embodiments. After the controller determines that an attempt is unsuccessful (via skill evaluation or randomly), no award decision making or random award generation is required. In an alternative embodiment, an unsuccessful skill attempt may be adapted to yield a consolation award.

The award arrays in the column 78 preferably contain numerical awards such as the 10, 50 and 100 shown in the award array 58*a*. A numerical award can represent any form of pecuniary or monetary gaming award, such as a number of credits, a multiplier number that multiplies a number of gaming device credits or any other prize desired by the implementor, such as a number of picks from a prize pool or a number of free games that can produce pecuniary awards. The monetary awards can have any value desired by the implementor, such as the 2, 10, 50 or 100 shown in the award array 78*a* and can ultimately be exchanged for money.

While the present invention is described in connection with what is presently considered to be the most practical and preferred embodiments, it should be appreciated that the invention is not limited to the disclosed embodiments, and is intended to cover various modifications and equivalent arrangements included within the spirit and scope of the claims. Modifications and variations in the present invention may be made without departing from the novel aspects of the invention as defined in the claims, and this application is limited only by the scope of the claims.

The invention is claimed as follows:

1. A gaming device comprising:

at least one display device;

at least one player input device;

at least one processor; and at least one memory device which stores a plurality of instructions which, when executed by the at least one processor, cause the at least one processor, after placement of a wager, to operate with the at least one display device and the at least one player input device, for each play of a game, to:

(a) cause a selection of a number of successful outcomes for the play of the game from a plurality of different numbers of successful outcomes, said selected number of successful outcomes being at least two; and (b) after selecting said number of successful outcomes for said play of the game:

(i) display display a plurality of sequential attempts at a skill event, wherein each attempt includes a display resulting from an activation of the at least one player input device, (ii) for each of the plurality of sequential attempts at the skill event, display if said attempt produces one of said successful outcomes based on at least one of how and when the at least one player input device is activated, and (iii) for each attempt which produces one of said successful outcomes, determine one of a plurality of different awards associated with said one of the successful outcomes to be provided to the player and provide the determined award to the player, wherein a number of attempts which produce successful outcomes in the play of the game is at least equal to the selected number of successful outcomes for said play of the game.

2. The gaming device of claim 1, wherein the number of attempts which produce one of said successful outcomes in the play of the game is greater than the selected number of successful outcomes for said play of the game.

3. The gaming device of claim 1, wherein the number of successful outcomes selected for said play of the game is randomly determined.

4. The gaming device of claim 1, wherein the number of successful outcomes selected for said play of the game is predetermined.

5. The gaming device of claim 1, wherein at least one determination in the game is based on a communication received from at least one remote network server.

6. The gaming device of claim 1, wherein the at least one processor includes a remote network server.

7. A gaming device comprising:

at least one display device;

at least one player input device;

at least one processor; and at least one memory device which stores a plurality of instructions which, when executed by the at least one processor, cause the at least one processor, after placement of a wager, to operate with the at least one display device and the at least one player input device, for each play of a game, to:

(a) cause a selection of a number of successful outcomes for the play of the game from a plurality of different numbers of successful outcomes, said selected number of successful outcomes being at least two; and (b) after selecting said number of successful outcomes for said play of the game:

(i) display an attempt at a skill event, wherein the attempt includes a display resulting from an activation of the at least one player input device, (ii) display if said attempt produces one of said successful outcomes based on at least one of how and when the at least one player input device is activated, (iii) if said attempt produces one of said successful outcomes, determine one of a plurality of different awards associated with said one of the successful outcomes to be provided to the player and provide said determined award to the player, and (iv) sequentially repeat (i) to (iii) until a number of attempts which produce successful outcomes in the play of the game is at least is equal to the selected number of successful outcomes for the play of the game.

8. The gaming device of claim 7, wherein the number of attempts which produce successful outcomes in the play of the game is greater than the selected number of successful outcomes for said play of the game.

9. The gaming device of claim 7, wherein the number of successful outcomes selected for said play of the game is randomly determined.

10. The gaming device of claim 7, wherein the number of successful outcomes selected for said play of the game is predetermined.

11. The gaming device of claim 7, wherein at least one determination in the game is based on a communication received from at least one remote network server.

12. The gaming device of claim 7, wherein the at least one processor includes a remote network server.

13. A method of operating a gaming device, said method comprising:

(a) receiving a wager; and (b) after receiving the wager, for each play of a game:

(i) causing a selection of a number of successful outcomes for the play of the game from a plurality of different numbers of successful outcomes, said selected number of successful outcomes being at least two; and (ii) after selecting said number of successful outcomes for said play of the game:

(A) causing at least one display device to display a plurality of sequential attempts at a skill event, wherein each attempt includes a display resulting from an activation of at least one player input device;

(B) for each of the plurality of sequential attempts at the skill event, causing said at least one display device to display if said attempt produces one of said successful outcomes based on at least one of how and when the at least one player input device is activated; and (C) for each attempt which produces one of said successful outcomes, determining one of a plurality of different awards associated with said one of the successful outcomes to be provided to the player and providing said determined award to the player, wherein a number of attempts which produce successful outcomes in said play of the game is at least equal to the selected number of successful outcomes for said play of the game.

14. The method of claim 13, wherein the number of attempts which produce successful outcomes in the play of the game is greater than the selected number of successful outcomes for said play of the game.

15. The method of claim 13, wherein the number of successful outcomes selected for said play of the game is randomly determined.

16. The method of claim 13, wherein the number of successful outcomes selected for said play of the game is predetermined.

17. The method of claim 13, which is provided through a data network.

18. The method of claim 17, wherein the data network is an internet.

19. A method of operating a gaming device, said method comprising:

(a) receiving a wager; and (b) after receiving the wager, for each play of a game:

(i) causing a selection of a number of successful outcomes for the play of the game from a plurality of different numbers of successful outcomes, said selected number of successful outcomes being at least two; and (ii) after selecting said number of successful outcomes for said play of the game:

(A) causing at least one display device to display an attempt at a skill event, wherein the attempt includes a display resulting from an activation of at least one player input device;

(B) causing the at least one display device to display if said attempt produces one of said successful outcomes based on at least one of how and when the at least one player input device is activated;

(C) if said attempt produces one of said successful outcomes, causing at least one display device to determine one of a plurality of different awards associated with said one of the successful outcomes to be provided to the player and providing said determined award to the player; and (D) repeating (A) to (C) until a number of attempts which produce successful outcomes in said play of the game is at least is equal to the selected number of successful outcomes for said play of the game.

20. The method of claim 19, wherein the number of attempts which produce successful outcomes in the play of the game is greater than the selected number of successful outcomes for said play of the game.

21. The method of claim 19, wherein the number of successful outcomes selected for said play of the game is randomly determined.

22. The method of claim 19, wherein the number of successful outcomes selected for said play of the game is predetermined.

23. The method of claim 19, which is provided through a data network.

24. The method of claim 23, wherein the data network is an internet.

* * * * *

UNITED STATES PATENT AND TRADEMARK OFFICE

CERTIFICATE OF CORRECTION

PATENT NO. : 7,846,015 B2
APPLICATION NO. : 11/673827
DATED : December 7, 2010
INVENTOR(S) : Bansemer et al.

It is certified that error appears in the above-identified patent and that said Letters Patent is hereby corrected as shown below:

IN THE CLAIMS:

Column 14, Line 28, replace “display display a plurality” with --display a plurality of--.

Signed and Sealed this
Fifteenth Day of March, 2011

David J. Kappos
*Director of the United States Patent and Trademark Office*